United States Patent [19]

Yang et al.

[11] Patent Number: 6,061,107
[45] Date of Patent: *May 9, 2000

[54] BISTABLE POLYMER DISPERSED CHOLESTERIC LIQUID CRYSTAL DISPLAYS

[75] Inventors: Deng-Ke Yang, Stow, Ohio; Zhijian Lu, Yorktown Heights, N.Y.; J. William Doane, Kent, Ohio

[73] Assignee: Kent State University, Kent, Ohio

[*] Notice: This patent issued on a continued prosecution application filed under 37 CFR 1.53(d), and is subject to the twenty year patent term provisions of 35 U.S.C. 154(a)(2).

[21] Appl. No.: 08/852,589

[22] Filed: May 7, 1997

Related U.S. Application Data

[60] Provisional application No. 60/017,256, May 10, 1996.

[51] Int. Cl.$^7$ ........................ G02F 1/1333; G02F 1/1339; G02F 1/137
[52] U.S. Cl. ............................... 349/86; 349/92; 349/93; 349/156; 349/35
[58] Field of Search ........................ 349/86, 92, 93, 349/156, 35

[56] References Cited

U.S. PATENT DOCUMENTS

| | | | |
|---|---|---|---|
| 4,097,127 | 6/1978 | Haas et al. | 349/35 |
| 4,101,207 | 7/1978 | Taylor | 350/344 |
| 4,673,255 | 6/1987 | West et al. | 349/92 |
| 4,728,547 | 3/1988 | Vaz et al. | 428/1 |
| 4,994,204 | 2/1991 | Doane et al. | 252/299.01 |
| 5,040,877 | 8/1991 | Blinc et al. | 359/63 |
| 5,240,636 | 8/1993 | Doane et al. | 252/299.01 |
| 5,251,048 | 10/1993 | Doane et al. | 351/51 |
| 5,264,950 | 11/1993 | West et al. | 359/51 |
| 5,321,533 | 6/1994 | Kumar | 359/51 |
| 5,437,811 | 8/1995 | Doane et al. | 349/86 |
| 5,450,220 | 9/1995 | Onishi et al. | 349/89 |
| 5,463,482 | 10/1995 | Jones | 349/86 |
| 5,473,450 | 12/1995 | Yamada et al. | 349/84 |
| 5,636,043 | 6/1997 | Uemura et al. | 349/86 |
| 5,668,614 | 9/1997 | Chien et al. | 349/176 |

FOREIGN PATENT DOCUMENTS 9-61793  3/1997  Japan ........................ 349/40

OTHER PUBLICATIONS

"Cholesteric Liquid Crystal/Polymer Gel Dispersion: Reflective Display Application", SID Digest, vol. 23, May 1992, p. 759, by D.-K. Yang and J.W. Doane.

"Front-lit Flat Panel Display from Polymer Stabilized Cholesteric Textures", Japanese Display, vol. 9, Oct. 1992, by J.W. Doane, D.-K. Yang, and Z. Yaniv.

"Surface Modified Reflective Cholesteric Displays", SID Digest, May 1995, by Z.-J. Lu, W.D. St. John, Z.-Y. Huang, D.-K. Yang, and J.W. Doane.

(List continued on next page.)

*Primary Examiner*—William L. Sikes
*Assistant Examiner*—Tarifur R. Chowdhury
*Attorney, Agent, or Firm*—Renner, Kenner, Greive, Bobak Taylor & Weber

[57] ABSTRACT

Polymer/cholesteric liquid crystal dispersions are provided in which the liquid crystal phase separated from the polymer matrix to form droplets. The cholesteric liquid crystals were positive dielectric anisotropic. At a zero field condition, the liquid crystal in the droplets was bistable, that is, the liquid crystal can be in either the reflecting planar state or the scattering focal conic state. When the liquid crystal 101 was in the planar texture, the helical axis of the liquid crystal was more or less perpendicular to the cell surface; colored light 105 was Bragg reflected. When the liquid crystal 101 was in the focal conic texture, the helical axis was more or less parallel to the cell surface, incident light was scattering 106 in the forward direction.

15 Claims, 10 Drawing Sheets

(2 of 10 Drawing Sheet(s) Filed in Color)

OTHER PUBLICATIONS

"Phase Separation of Liquid Crystals in Polymers", Mol. Cryst. Liq. Cryst. Inc. Nonlin. Opt., 1988, vol. 157, pp. 427–441, by John L. West.

"Field controlled light scattering from nematic microdroplets", Appl. Phys. Lett. 48(4) Jan. 27, 1986, pp. 269–, by Doane, Vaz, Wu and Zumer.

"Contrast ratios of polymer–dispersed liquid crystal films", Applied Optics, vol. 26, No. 4, Feb. 15, 1987, pp. 738–743, by Montgomery and Vaz.

"Droplet size control in polymer dispersed liquid crystal films", Proc. SPIE, vol. 1080, 53 (1989), by Lackner, Margerum, Ramos and Lim.

"Polymer–Dispersed and Encapsulated Liquid Crystal Films", Research Publication GMR–6402, Sep. 9, 1988, by Montgomery.

"A Light Control Film Composed of Liquid Crystal Droplets Dispersed in a UV–Curable Polymer",Liq. Cryst., 1987, vol. 146, pp. 1–15, by Vaz, Smith and Montgomery.

"Polymer dispersed nematic liquid crystal for large area displays and light valves", J.Appl. Phys. 60(6), Sep. 15, 1986, by Drzaic, pp. 2142–2148.

"Polymer Encapsulated Nematic Liquid Crystals for Display and Light Control Applications", SID 85 Digest, by Fergason, pp. 68–70, no date.

"Morphological control in polymer–dispersed liquid crystal film matrices",Proc. SPIE, vol. 1080, 24 (1989), by Yamagishi, Miller, and van Ast.

"Electrically Induced Light Scattering form Anisotropic Gels", Journal of Applied Physics, 68(9), 4406 (1990), by R.A.M. Hikmet.

FIG. 10

BISTABLE POLYMER DISPERSED CHOLESTERIC LIQUID CRYSTAL DISPLAYS

CROSS-REFERENCE TO RELATED APPLICATIONS

This application claims priority from U.S. Provisional Patent Application No. 60/017,256, filed May 10, 1996.

GOVERNMENT RIGHTS IN THE INVENTION

The United States government has a paid-up license in this invention and may have the right in limited circumstances to require the patent owner to license others on reasonable terms as provided for by the terms of Grant DMR89-20147, awarded by the National Science Foundation; and by Contract MDA972-91-J-1020, awarded by Advanced Research Projects Agency.

FIELD OF THE INVENTION

The present invention relates to bistable cholesteric liquid crystal displays. The invention relates particularly to bistable cholesteric liquid crystal displays in which the liquid crystal material is present in droplets within a polymer matrix.

BACKGROUND OF THE INVENTION

Polymer dispersed liquid crystals (PDLCS) are a new type of light shutter which has been studied intensively in recent years. In a PDLC light shutter, the dispersed liquid crystal exists in the form of droplets with a diameter of about 1 micron. The configuration of the liquid crystal inside the droplet depends on the size and shape of the droplet as well as on the boundary condition and the external field. From the application point of view, PDLCs have unique optical properties: opaque in a field-OFF condition and transparent in a field-ON condition. They do not require polarizers and have very high transmittance in the ON-state. PDLCs may be used for switchable windows, direct view and projection displays.

Starting from a uniform mixture of liquid crystal and polymer, phase separation can be induced by temperature change (Temperature Induced Phase Separation or TIPS), solvent evaporation (Solvent Induced Phase Separation or SIPS), and polymerization of the polymer precursor in the mixture (Polymerization Induced Phase Separation or PIPS).

The size of the droplets can be controlled by the phase separation conditions. If the droplet size is small (about 1 micron), the polymer dispersed liquid crystal strongly scatters light in the field-off state and is transparent in the field-on state. With a bigger droplet size, the light scattering becomes much weaker. If the liquid crystal is nematic, the PDLC cell looks transparent. When nematic liquid crystals are replaced with cholesteric liquid crystals of pitch comparable to the wavelength of visible light, the display exhibits the selective reflection property of cholesteric liquid crystals.

SUMMARY OF THE INVENTION

The present invention provides bistable polymer dispersed cholesteric liquid crystal displays (BPDCLC).

In the preparation of liquid crystal display cells, cholesteric liquid crystals with positive anisotropy are used. The cholesteric liquid crystals are confined in droplets or domains which are larger in size than the cell thickness.

Cholesteric liquid crystals can be in the planar or focal conic texture. Both the planar and focal conic textures are stable under zero field. The display cell is reflective when the cholesteric liquid crystals are in the planar texture and is black when the cholesteric liquid crystals are in focal conic texture (i.e., with the coating of black paint on the back substrate). Between regions of liquid crystal material are solid polymer walls.

Multicolor reflective cholesteric displays are prepared which require that cholesteric liquid crystals with different pitches are confined in different pixels. The solid polymer walls prevent inter-pixel diffusion of the cholesteric liquid crystals.

BRIEF DESCRIPTION OF THE DRAWINGS

The file of this patent contains at least one drawing executed in color. Copies of this patent with color drawings will be provided by the Patent and Trademark Office upon request and payment of the necessary fee.

DETAILED DESCRIPTION OF PREFERRED EMBODIMENTS

Bistability of cholesteric liquid crystals is preserved for cholesteric liquid crystal confined in droplets within a polymer matrix, which polymer is used to prevent diffusion of the liquid crystal between the droplets.

According to the invention, a thermoplastic and cholesteric liquid crystal mixture is formed. The mixture is in a uniform solution at high temperature. When the mixture is cooled down, it phase separates and liquid crystal droplets are formed in the polymer matrix. The cholesteric liquid crystal used preferably has a positive dielectric anisotropy and can be aligned parallel to an external field. When a low electric field is applied perpendicular to the surface of the cell, the liquid crystal inside the droplet is transformed into a configuration where the helical axes are more and less parallel to the surface of the cell, and the cell appears weakly scattering. After the removal of the field, the liquid crystal remains in this state. If the back plate of the cell is painted black, the cell appears black in this state.

When a high voltage is applied to the cell, the liquid crystal is switched into the nematic state with the director parallel to the field. After the removal of the field, the liquid crystal relaxes back to a configuration where the helical axes are more or less perpendicular to the surface of the cell, and the cell appears color reflective.

The liquid crystal/chiral agent recipes of liquid crystal displays to be encapsulated in droplets within the polymer matrix according to the present invention may be selected from those used in cholesteric liquid crystal bistable displays such as polymer stabilized cholesteric texture bistable displays and surface modified cholesteric liquid crystal bistable displays. Thermoplastics, such as polyvinyl butyral (PVB) are used for the matrix polymer.

Although the liquid crystal display works with droplets of widely varying shapes and sizes, droplets having an oval or oblong shape and droplet diameter between about 10–50 $\mu$m are preferred.

Polymer/cholesteric liquid crystal dispersions were prepared in which the liquid crystal phase separated from the polymer matrix to form droplets. The cholesteric liquid crystals were positive dielectric anisotropic. At a zero field condition, the liquid crystal in the droplets was bistable, that is, the liquid crystal can be in either the reflecting planar state or the scattering focal conic state.

Figure 1A:
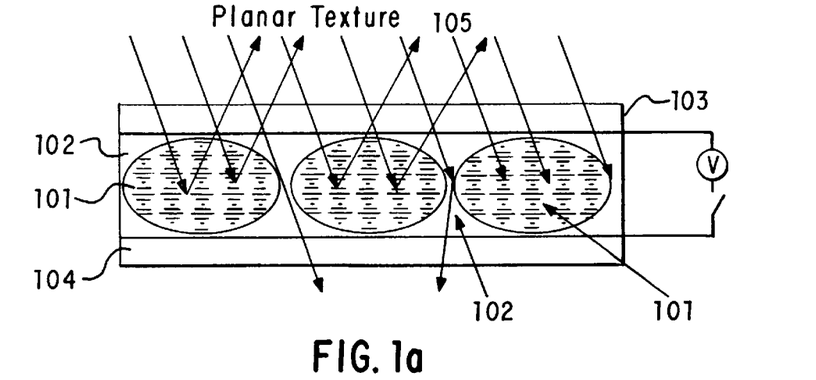
FIGS. 1a, b and c are cross sections of a display cell showing textures of bistable polymer dispersed cholesteric liquid crystal.
Figure 1B:
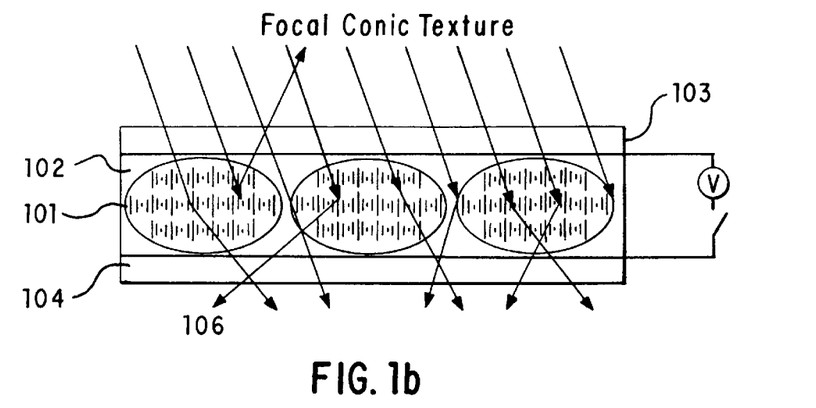

When the liquid crystal 101 was in the planar texture as shown in FIG. 1a, the helical axis of the liquid crystal was more or less perpendicular to the cell surface; colored light 105 was Bragg reflected. When the liquid crystal 101 was in the focal conic texture as shown in FIG. 1b, the helical axis was more or less parallel to the cell surface, incident light was scattering 106 in the forward direction.

Figure 1C:
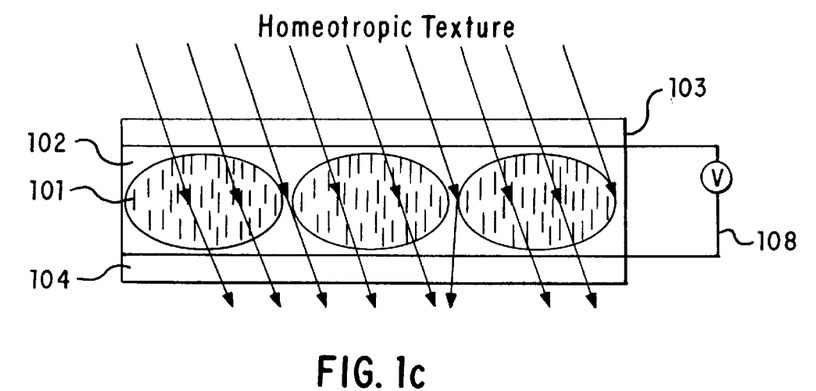

The liquid crystal can be switched from the planar texture to the focal conic texture by application of an electric voltage in a circuit 108. If the voltage was turned off from the focal conic texture, it remained in that state. When a sufficiently high voltage was applied to the cell, the liquid crystal was switched to the homeotropic texture where the helical structure was unwound as shown in FIG. 1c. If the high voltage was turned off quickly, the liquid crystal relaxed to the planar texture.

Figure 2:
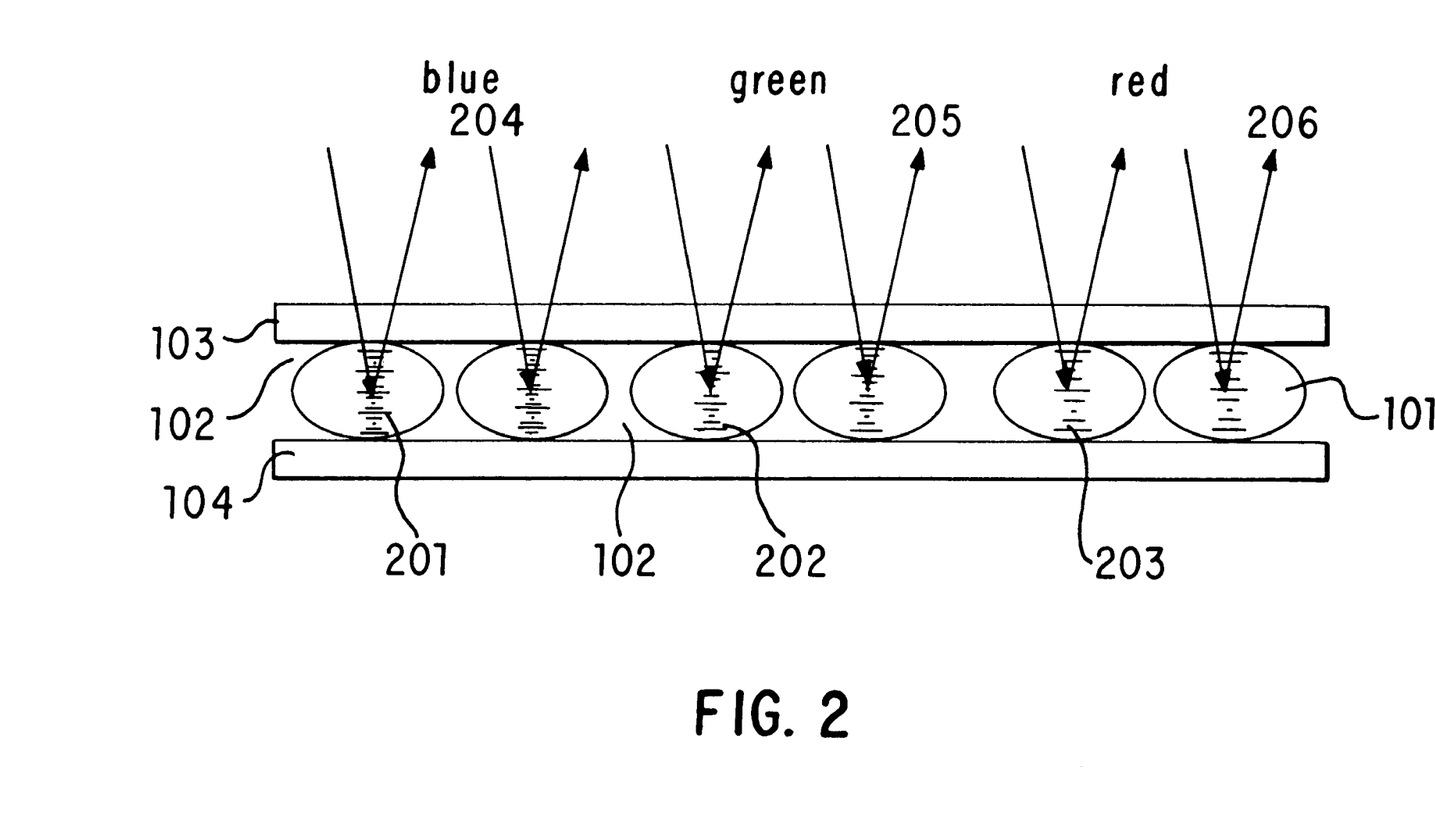
FIG. 2 is a cross section of a multicolor bistable polymer dispersed cholesteric liquid crystal display cell.

The polymer/cholesteric liquid crystal dispersions were used for multiple color displays. The cholesteric liquid crystal 101 in different pixels had different pitches 201, 202, 203, and therefore different color light, blue 204, green 205 and red 206, was reflected from different pixels as shown in FIG. 2. The polymer 102 played the role of a partition or separator to prevent liquid crystal diffusion between the pixels.

EXAMPLE 1

Single Color BPDCLC

The following materials were mixed:

| | |
|---|---|
| E48 (nematic liquid crystal from EM): | 57.6 wt % |
| R1011 (chiral agent from EM): | 3.2 wt % |
| CB15 (chiral agent from EM): | 9.6 wt % |
| CE1 (chiral agent from EM): | 9.6 wt % |
| PVB (thermoplastic polymer); | 20 wt %. |

The mixture was dissolved in toluene. The solution was coated on a glass plate 104 having a transparent indium tin oxide (ITO) coating to serve as the electrode. The sample was put in a open space to let the solvent to evaporate. After evaporation of the solvent, the sample (glass plate coated with the partially dried mixture) was heated to 100° C. A second glass plate 103 having an ITO coating was put on top of the sample. The cell thickness was controlled by 5 micron glass fiber spacers. The cell was then cooled to room temperature at the rate of 0.5° C./minute. Oval droplets having diameters of about 15 microns were obtained. The cell reflected green light and exhibited bistability.

EXAMPLE 2

A bistable cholesteric liquid crystal mixture which reflects green light (80%) and polyvinyl butyral polymer (20%) were mixed with solvent (toluene) and were then dropped onto an ITO coated glass plate. The plate was set out for 2 hours to permit the solvent to evaporate. A second ITO coated glass plate was then put on top of the film and pressed to the thickness controlled by glass fibers. The cell was heated to 100° C. and then cooled down slowly. The droplet size was controlled to be about 40 microns by controlling the cooling rate.

Figure 3A:
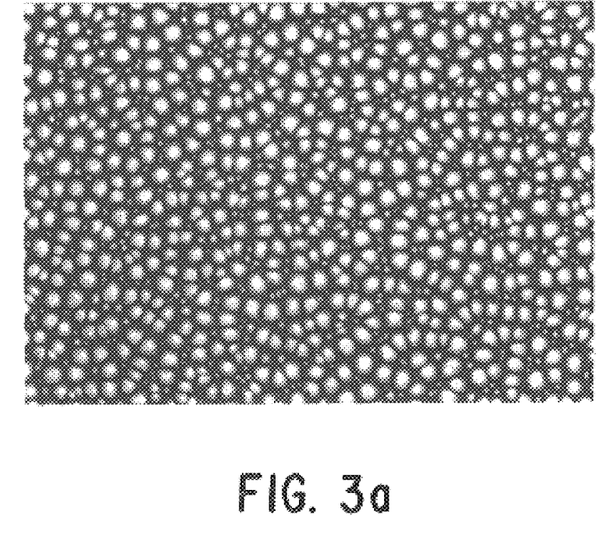
FIGS. 3a and b are microphotographs of a polymer dispersed reflective cholesteric liquid crystal display cell (a) in the reflecting state and (b) in the black state.
Figure 3B:
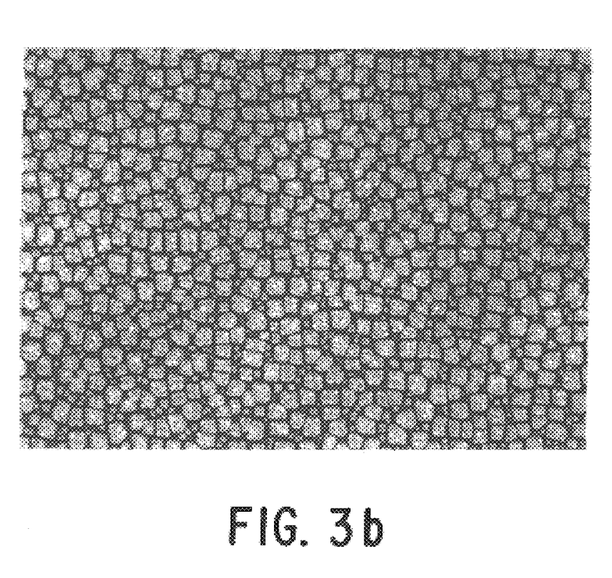

FIGS. 3a and 3b shows the textures of the resulting polymer dispersed bistable reflective cholesteric display cell. Black areas are polymer regions. FIG. 3a is microphotograph of the reflecting state under a microscope with crossed polarizers. Because the droplet size is much larger than the pitch of the cholesteric liquid crystals, inside the droplets the liquid crystal molecules behaves similar to the case of surface modified reflective cholesteric displays. The cholesteric liquid crystals are in an imperfect planar texture in this state. Strong selective reflection is observed and the color of the reflected light can be varied by changing the pitch of the cholesteric liquid crystal.

FIG. 3b shows the black state, in which the cholesteric liquid crystals are in the focal conic texture. In order to obtain a clear picture of the focal conic texture, an exposure time much higher than that used for the reflecting state was utilized.

Figure 4:
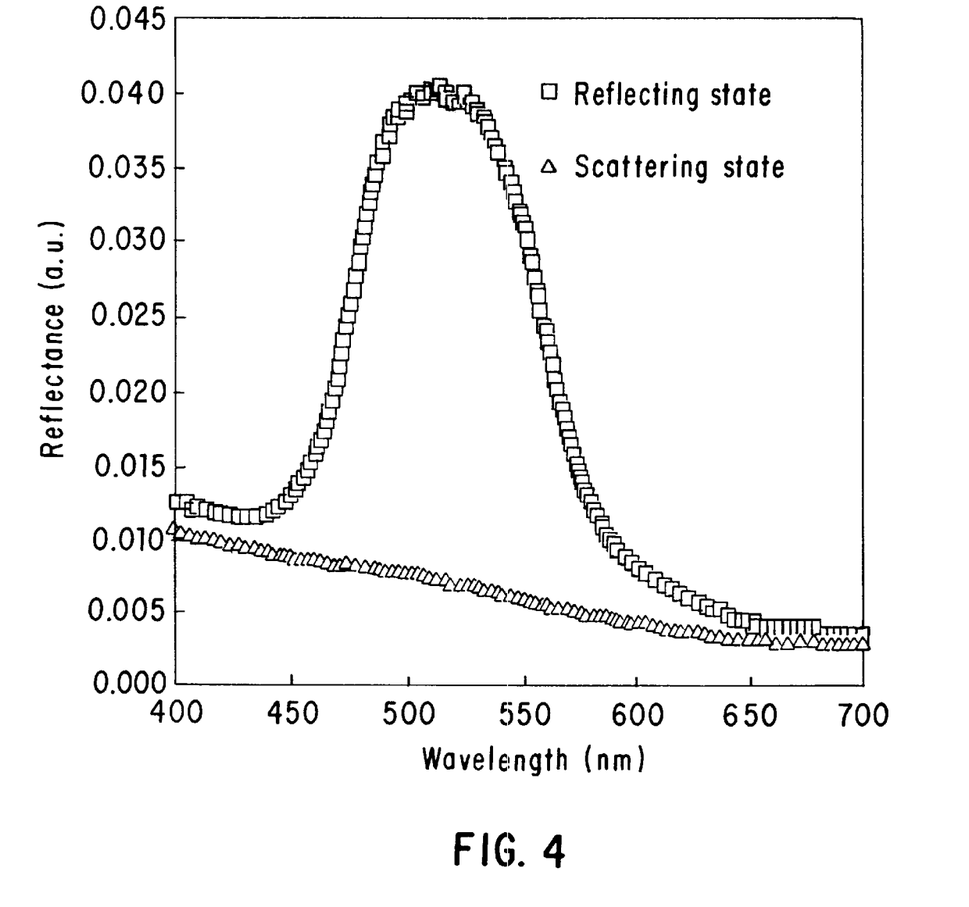
FIG. 4 is a graph of the reflection spectra of a polymer dispersed reflective cholesteric liquid crystal display cell in both the reflecting state and in the black state.

FIG. 4 shows the reflectance spectra of a polymer dispersed cholesteric reflective display cell in both a reflective and a black state. Crossed polarizers were used to eliminate the reflection from the glass-air interface. The incident angle and detection angle were both set at 22.5°. As shown in FIG. 4, the high reflection peak is observed in the reflecting state. In the black state, the spectrum does not show any reflection peak and the reflectance is comparatively low.

Figure 5:
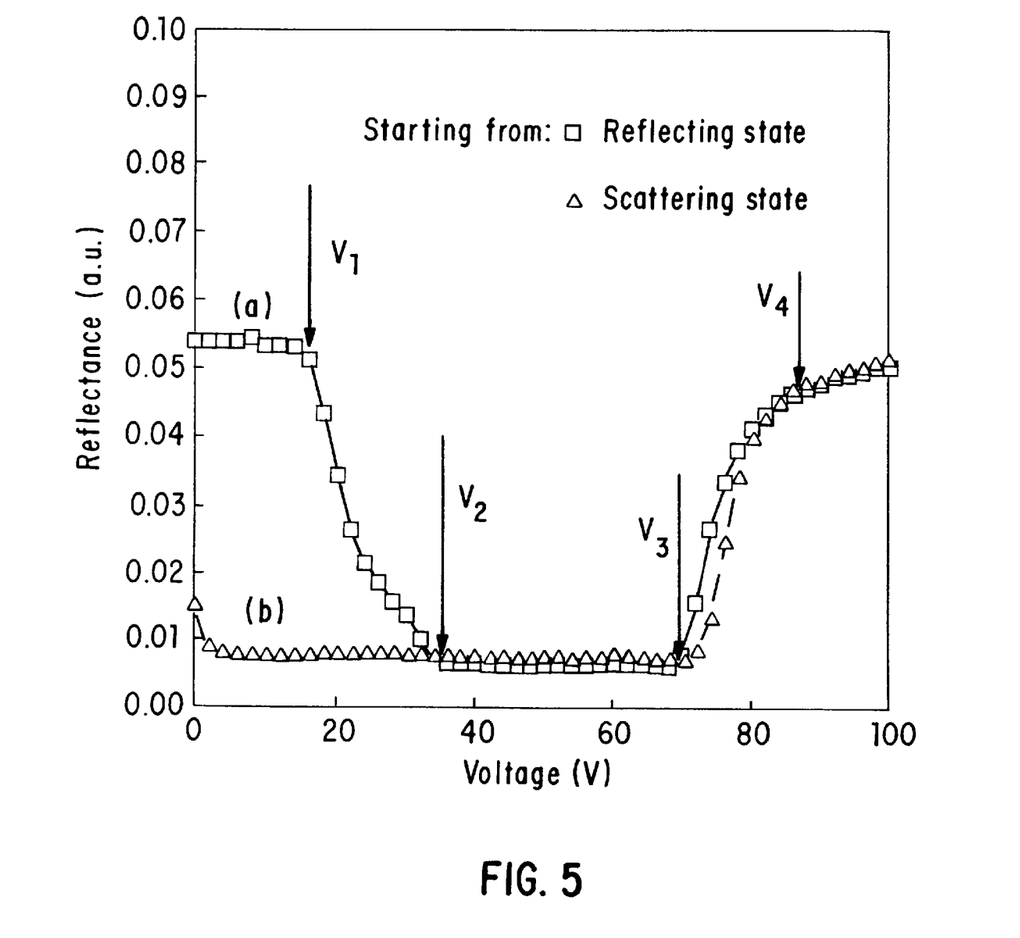
FIG. 5 is a graph of the gray scale of a polymer dispersed reflective cholesteric liquid crystal display cell (a) in the reflecting state and (b) in the black state.

The gray scale curves of FIG. 5 for the polymer dispersed cholesteric reflective display cell are the plots of the reflectance measured 800 ms after removal of the electric field at various values. For curve (a), the initial state is reflecting, for curve (b) the initial state is black. A voltage pulse higher than 86 volts switched the display cell into the reflecting state and a voltage pulse between 35 and 70 volts switched the display cell into the scattering state.

Figure 6:
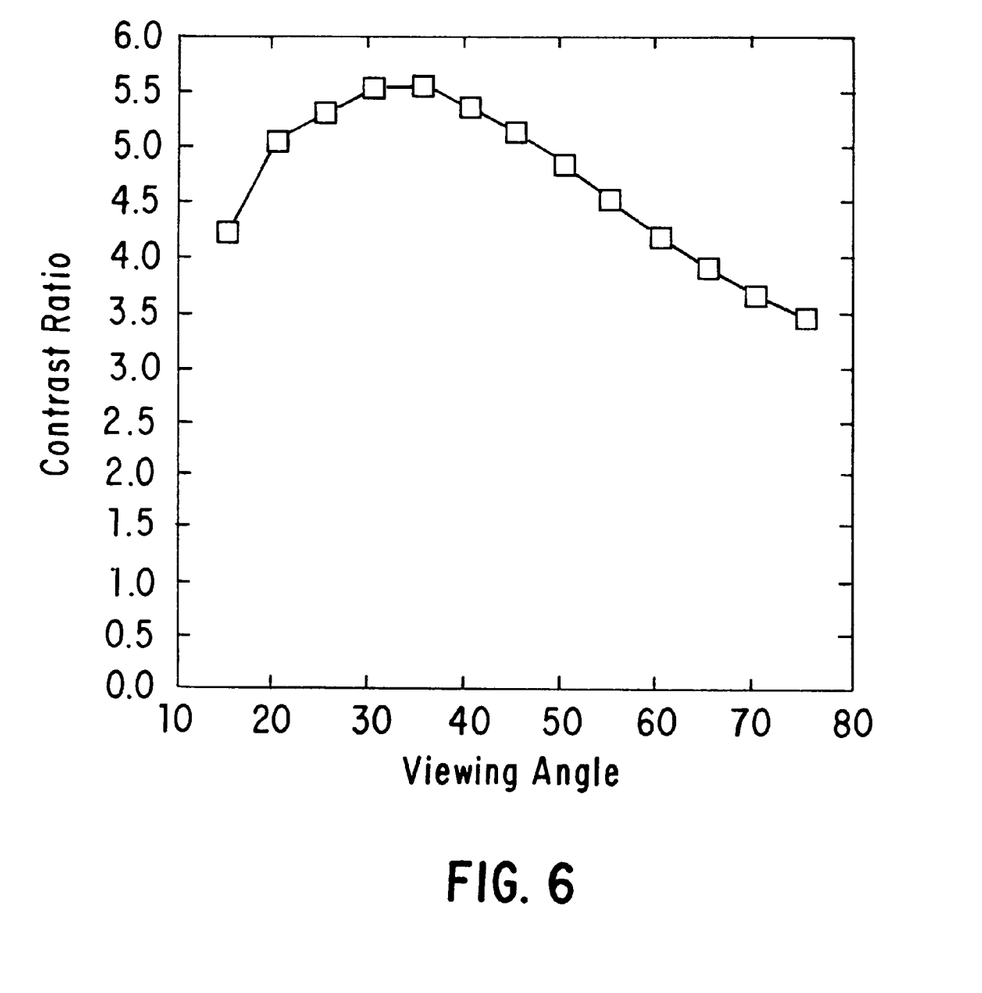
FIG. 6 is a graph of the contrast ratios of polymer dispersed reflective cholesteric liquid crystal displays versus viewing angle.

The angular dependence of the display was tested, and the results are shown in FIG. 6. The incident angle $\alpha$ was fixed at 45° and the detecting angle $\beta$ was varied from −30° to 30°. FIG. 6 shows the contrast ratios for the polymer dispersed cholesteric reflective display cell at different detecting or viewing angles. The highest contrast was obtained when the detecting direction was close to the cell normal. The contrast decreased when the detecting angle approached the specular reflecting angle ($\beta$=45°). This decrease was caused by light reflected from the glass-air interface in both the reflecting and black states.

In polymer dispersed reflective cholesteric displays, according to the present invention, there exist polymer walls which separate cholesteric liquid crystal domains; hence liquid crystals are localized. This property makes it possible to confine cholesteric liquid crystals with different pitch in different regions to make multicolor displays.

A multicolor display was prepared by the use of a photo tunable chiral material (TCM) which was added to the cholesteric liquid crystal mixture. Different pitch lengths were achieved by irradiating with different doses of UV light.

The photo tunable chiral material, UM-III-16-93, having a melting point of 82° C. was used. This material possesses a high twisting power and has the same twisting sense as other chiral materials used herein. The chirality of the TCM material decreases with the increase of the UV dosage. In the cell preparation, normal chiral material R1011, CB15 and CE1 were first mixed with the ratio 1:3:3. The photo tunable material was then mixed with the chiral mixture. Nematic liquid crystal E48 and polymer were added to the mixture. The display cell was then prepared as described below in Example 3.

EXAMPLE 3

Multiple Color BPDCLC

The following materials were mixed:

| | |
|---|---|
| E48 (nematic liquid crystal from EM): | 55.2 wt % |
| R1O11 (chiral agent from EM): | 2.4 wt % |
| CB15 (chiral agent from EM): | 7.2 wt % |
| CE1 (chiral agent from EM): | 7.2 wt % |
| UM-III-16-93 (lab-synthesized photo tunable chiral agent): | 8.0 wt % |
| PVB (thermoplastic polymer): | 20.0 wt %. |

The mixture was dissolved in toluene. The solution was coated on a glass plate having a transparent ITO coating as an electrode. The sample was put in a open space to let the solvent to evaporate. After the evaporation of the solvent, the sample was heated to 100° C. A second glass plate having an ITO coating was placed on top of the sample. The cell thickness was controlled by 5 micron glass fiber spacers. The cell was then cooled to room temperature at the rate of 0.5° C./minute. Oval droplets having diameters of about 15 microns were obtained. The cell reflected blue light and exhibited bistability. The cell was then irradiated by UV light to tune the color. Different pixels were irradiated by different UV doses to achieve different colors as listed below.

| Pixel # | 1 | 2 | 3 | 4 |
|---|---|---|---|---|
| Time (hours) | 0 | 9 | 24.5 | 47.5 |
| UV dose (J/cm$^2$) | 0 | 130 | 353 | 684 |
| Color | blue | green-blue | yellow | orange-red |

Figure 7:
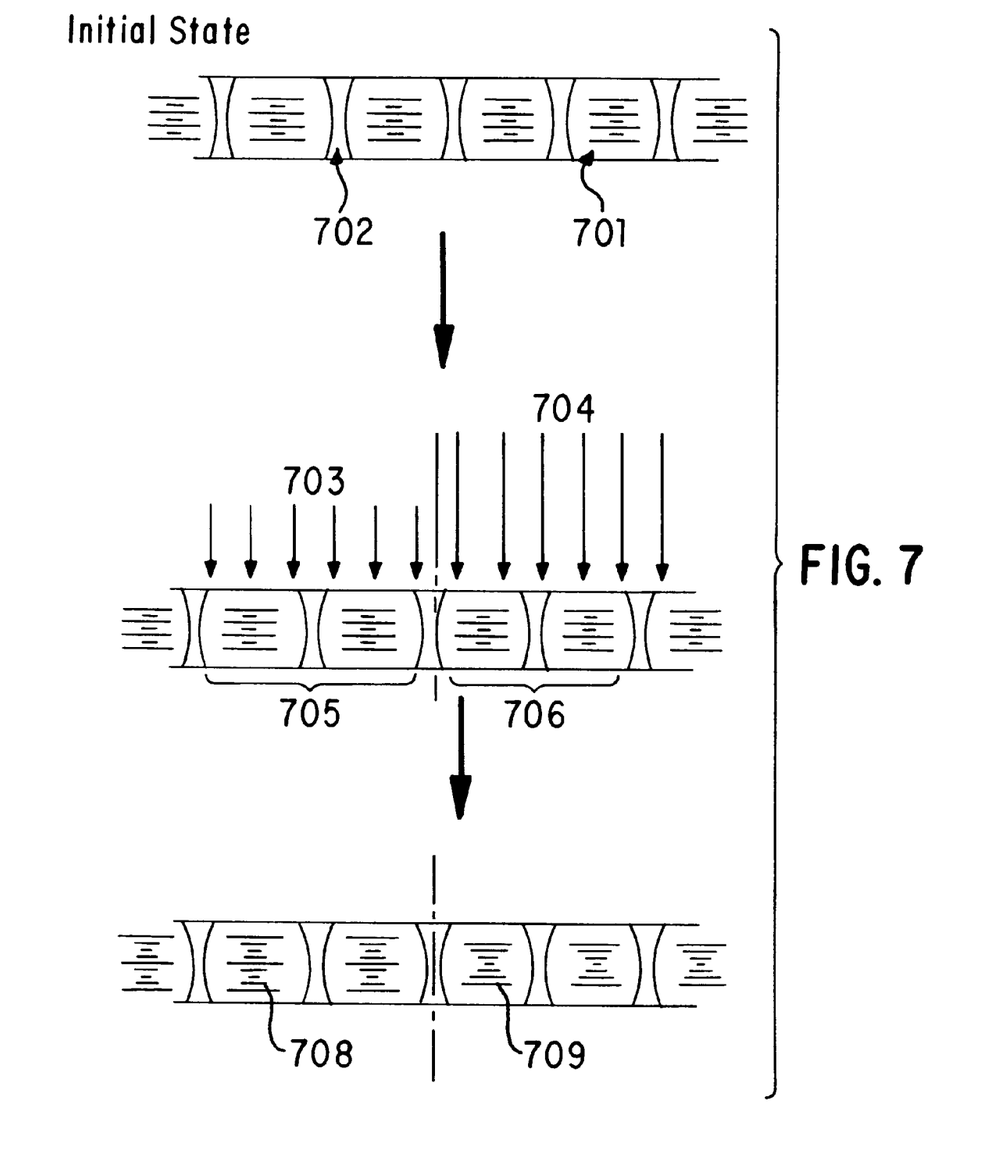
FIG. 7 is a schematic diagram showing in cross section a multicolor bistable polymer dispersed cholesteric liquid crystal display cell during the UV irradiation process and the corresponding pitch change.

The UV irradiation process and the corresponding change in the pitch is illustrated in FIG. 7. Starting from the cell with well phase-separated liquid crystal 701 and polymer 702 regions, the cell was then covered with a mask to shine different doses of UV light 703, 704 to different pixels 705, 706. The cholesteric liquid crystals with different pitches 708, 709 were obtained, and were localized in the predetermined, selected pixels.

Figure 8:
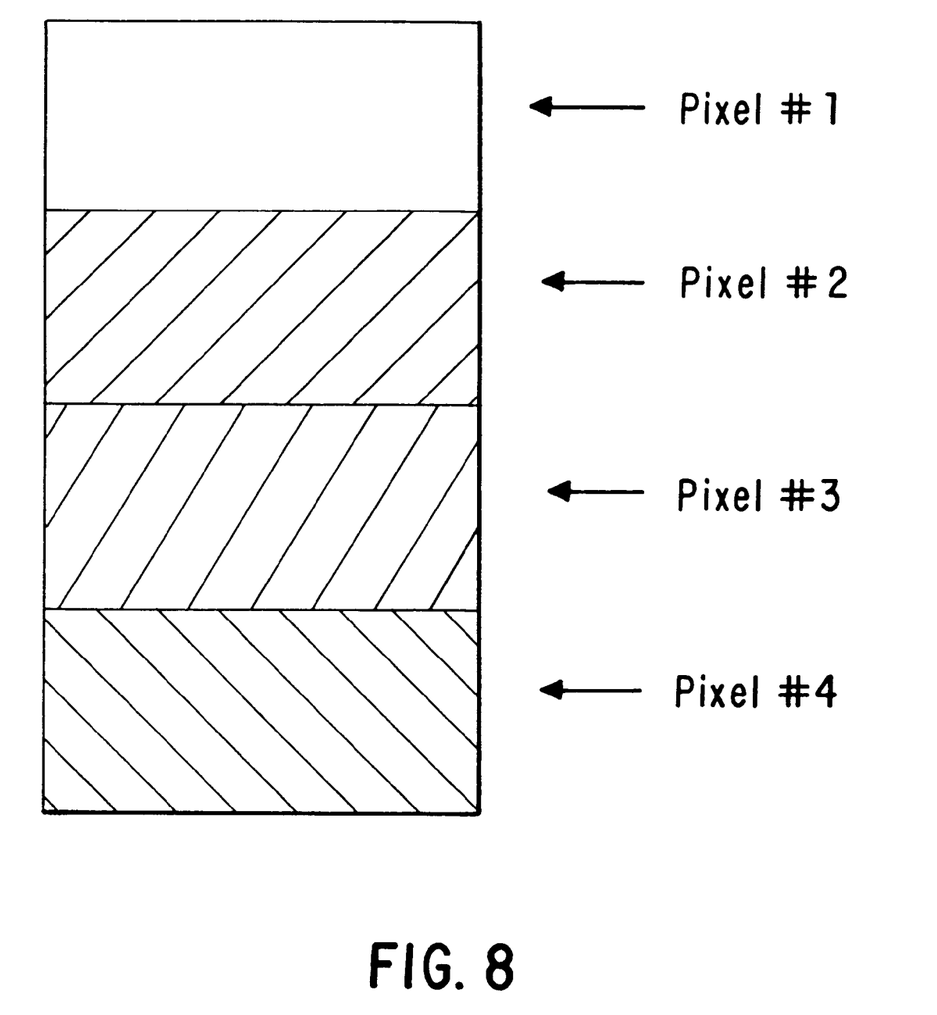
FIG. 8 is a schematic design of a multicolor polymer dispersed cholesteric liquid crystal display cell.
Figure 9A:
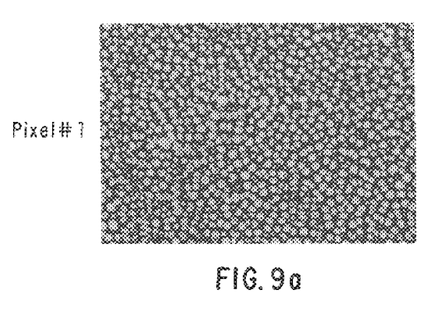
FIG. 9 is a microphotograph of pixels in a multicolor polymer dispersed cholesteric liquid crystal display cell.
Figure 9B:
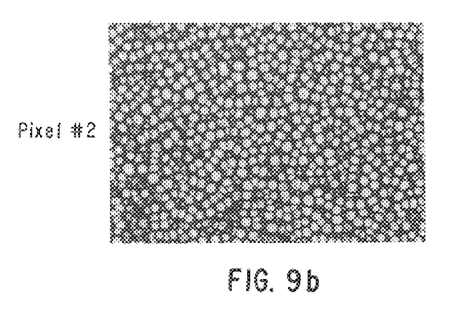
Figure 9C:
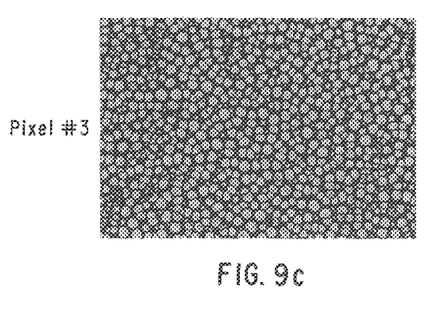
Figure 9D:
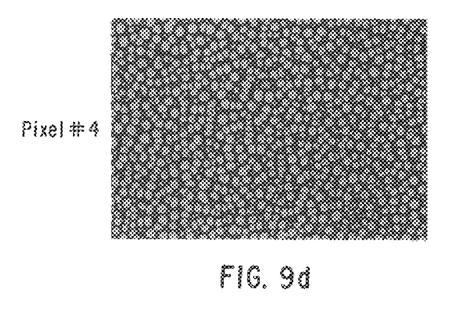
Figure 10:
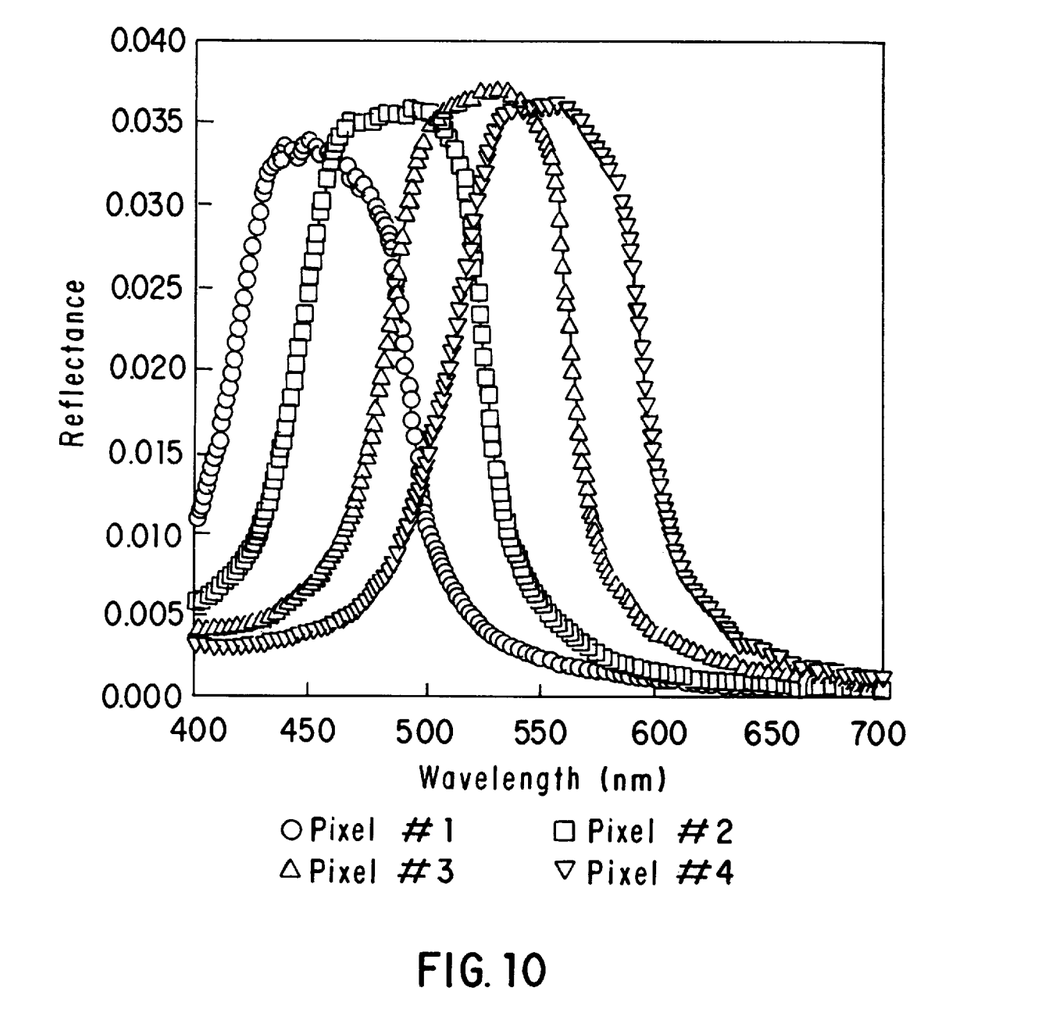
FIG. 10 is a graph of the reflection spectra from individual pixels of the multicolor polymer dispersed cholesteric liquid crystal display cell.

According to the procedures described above, a display cell with four different colors was made. FIG. 8 illustrates the design of the multicolor display cell. FIG. 9 shows microphotographs of the different pixels. FIG. 10 shows the reflection spectrum from the different colored pixels. The peak reflectance was almost the same for the different pixels. The peak wavelength shifts from 440 nm to 570 nm. In this measurement, $\alpha=\beta=22.5°$ and the cross polarizers were used.

The polymer dispersed liquid crystal technique is thus demonstrated to be useful in making multicolor reflective, bistable polymer dispersed cholesteric liquid crystal displays. High resolution multicolor displays can be made by PIPS through the patterning of polymerization regions.

A liquid crystal display containing a bistable polymer dispersed cholesteric liquid according to the present invention has several advantages. It is suitable for large area displays, and is not sensitive to pressure. The inventive material can be laminated on glass or plastic substrates, which substrates will be held together by the polymer, which is self-adhesive. There is no need for edge sealing in manufacturing.

The liquid crystal is localized inside the droplet. It can be used to make multicolor displays with different pitches in different droplets. Diffusion between the liquid crystal materials in different droplets (with different pitches) is prevented. The droplet size of the liquid crystal can be controlled by the process of phase separation. For example, if a thermoplastic is used, the droplet size is controlled by the cooling rate.

The dynamic properties of the display can be modified by controlling the droplet size. For example, the reflectance and viewing angle can be regulated by the droplet size, as well as by anchoring in the liquid crystal and polymer interface, and the degree of separation of polymer and liquid crystals. A high droplet density and thus a high volume fraction of liquid crystal material in the droplet/polymer layer can be used to achieve reflection as high as other cholesteric liquid crystal bistable displays.

As shown above, polymer/cholesteric liquid crystal dispersions are provided in which the liquid crystal phase separated from the polymer matrix to form droplets. The cholesteric liquid crystals were positive dielectric anisotropic. At a zero field condition, the liquid crystal in the droplets was bistable, that is, the liquid crystal can be in either the reflecting planar state or the scattering focal conic state. When the liquid crystal 101 was in the planar texture, the helical axis of the liquid crystal was more or less perpendicular to the cell surface; colored light 105 was Bragg reflected. When the liquid crystal 101 was in the focal conic texture, the helical axis was more or less parallel to the cell surface, incident light was scattering 106 in the forward direction.

The liquid crystal can be switched from the planar texture to the focal conic texture by application of an electric voltage in a circuit 108. If the voltage was turned off from the focal conic texture, it remained in that state. When a sufficiently high voltage was applied to the cell, the liquid crystal was switched to the homeotropic texture where the helical structure was unwound. If the high voltage was turned off quickly, the liquid crystal relaxed to the planar texture.

The polymer/cholesteric liquid crystal dispersions were used for multiple color displays. The cholesteric liquid crystal 101 in different pixels had different pitches 201, 202, 203, and therefore different color light, blue 204, green 205 and red 206, was reflected from different pixels. The polymer 102 played the role of a partition or separator to prevent liquid crystal diffusion between the pixels.

Thus, the objects of the invention are accomplished by the present invention, which is not limited to the specific embodiments described above, but which includes variations, modifications and equivalent embodiments defined by the following claims.

What is claimed is:

1. A bistable polymer dispersed cholesteric liquid crystal display comprising cells containing cholesteric liquid crystals having positive dielectric anisotropy, confined in domains which have a major axis and a minor axis, and wherein the major axis is larger in size than the cell thickness, wherein solid polymer walls are disposed between regions of liquid crystals.

2. The liquid crystal display of claim 1 wherein the domains comprise droplets.

3. The liquid crystal display of claim 2 having a black backplate, wherein the cell appears weakly scattering when a low electric field is applied perpendicular to the surface of the cell, and after the removal of the field the cell appears black.

4. The liquid crystal display of claim 3, wherein the liquid crystal within the droplet is transformed into a configuration where its helical axes are substantially parallel to the surface of the cell, and after removal of the field, the liquid crystal remains in this configuration.

5. The liquid crystal display of claim 3, wherein the cell appears color reflective when a high voltage is applied to the cell and is thereafter removed.

6. The liquid crystal display of claim 5, wherein the liquid crystal is switched into a homeotropic state with its director parallel to the applied high field, and after removal of the field, the liquid crystal relaxes back to a configuration where the helical axes are substantially perpendicular to the surface of the cell.

7. The liquid crystal display of claim 2 wherein droplets have an oval or oblong shape and droplet diameter between about 10 to about 50 $\mu$m.

8. The liquid crystal display of claim 1 having planar and focal conic textures, wherein both the planar and focal conic textures of the liquid crystals are stable under zero field.

9. The liquid crystal display of claim 1 wherein the cell is reflective when the cholesteric liquid crystals are in planar texture and is black when the cholesteric liquid crystals are in focal conic texture.

10. The liquid crystal of claim 1 wherein the liquid crystal is a liquid crystal that reflects visible light.

11. A method of making a multicolor reflective, bistable polymer dispersed cholesteric liquid crystal display comprising, providing a mixture comprising a photo tunable chiral material, a liquid crystal and polymer; dissolving the mixture in a solvent to form a solution; introducing the solution into a cell and heating; cooling the mixture to obtain droplets of liquid crystal material in polymer that forms domains that have a major axis and a minor axis, and wherein the major axis is larger in size than the cell thickness for a majority of the domains; masking and exposing with UV light, selected portions of the cell to localize cholesteric liquid crystal material of differing pitches in predetermined pixels within the cell.

12. The method of claim 11 wherein the polymer is a thermoplastic.

13. The method of claim 12 including controlling droplet size by the rate of cooling the mixture.

14. The method of claim 11 including forming a high droplet density in the polymer.

15. The method of claim 11 including forming pixels of four different colors by varying UV exposure times to various portions of the cell.

* * * * *